(12) United States Patent
Chae et al.

(10) Patent No.: US 11,385,690 B2
(45) Date of Patent: Jul. 12, 2022

(54) ELECTRONIC DEVICE FOR SWITCHING BETWEEN COMMUNICATION CHANNELS AND CONTROL METHOD THEREOF

(71) Applicant: Samsung Electronics Co., Ltd., Suwon-si (KR)

(72) Inventors: Sangwon Chae, Suwon-si (KR); Sunmin Park, Suwon-si (KR); Jaeyoung Huh, Suwon-si (KR); Mooyoung Kim, Suwon-si (KR); Minjung Kim, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/862,009

(22) Filed: Apr. 29, 2020

(65) Prior Publication Data

US 2020/0356149 A1 Nov. 12, 2020

(30) Foreign Application Priority Data

May 8, 2019 (KR) .................. 10-2019-0053882

(51) Int. Cl.
*G06F 1/20* (2006.01)
*G06F 1/3287* (2019.01)
*H04W 52/02* (2009.01)

(52) U.S. Cl.
CPC ............ *G06F 1/206* (2013.01); *G06F 1/3287* (2013.01); *H04W 52/0254* (2013.01); *H04W 52/0267* (2013.01); *H04W 52/0274* (2013.01)

(58) Field of Classification Search
CPC ...... G06F 1/206; G06F 1/3209; G06F 1/3215; G06F 1/3228; G06F 1/3243;
(Continued)

(56) References Cited

U.S. PATENT DOCUMENTS 9,635,486 B2 4/2017 Ford et al.
9,908,047 B2 3/2018 Gallizzi et al.
(Continued)

FOREIGN PATENT DOCUMENTS

| CN | 105101436 B | 11/2018 |
|----|----|----|
| JP | 2008-244603 A | 10/2008 |
| WO | 2018/182260 A1 | 10/2018 |

OTHER PUBLICATIONS

International Search Report dated Jul. 30, 2020, issued in International Patent Application No. PCT/KR2020/005618.
(Continued)

*Primary Examiner* — Chun Cao
(74) *Attorney, Agent, or Firm* — Jefferson IP Law, LLP

(57) ABSTRACT

An electronic device is provided. The electronic device includes a wireless communication module including a first communication processor and a second communication processor, a sensor module, at least one processor, and at least one memory configured to store instructions, executable by the at least one processor, for identifying an execution status of the application and temperature of at least part of the electronic device, deactivating the second communication processor based on the identified execution status of the application and the identified temperature, and activating the second communication processor based on network traffic being processed by the first communication processor being greater than a predetermined threshold.

18 Claims, 11 Drawing Sheets

(58) Field of Classification Search
CPC ............ G06F 1/3287; H04W 52/0267; H04W 52/0274; H04W 24/02; H04W 28/0284; H04W 88/06; G05B 15/02; Y02D 10/00; Y02D 30/70; H04B 1/0064; H04B 1/401; H04M 1/72454; H04M 2250/12
USPC .......................................................... 700/299
See application file for complete search history.

(56) References Cited

U.S. PATENT DOCUMENTS

| | | | |
|---|---|---|---|
| 9,968,847 B2 | 5/2018 | Perlman et al. | |
| 2006/0193250 A1* | 8/2006 | Desjardins | G06F 1/206 370/219 |
| 2010/0091747 A1 | 4/2010 | Dorsey et al. | |
| 2011/0145605 A1* | 6/2011 | Sur | G06F 1/329 713/300 |
| 2013/0120630 A1 | 5/2013 | Kim et al. | |
| 2013/0332720 A1 | 12/2013 | Gupta et al. | |
| 2014/0155067 A1* | 6/2014 | Saito | H04W 36/0022 455/437 |
| 2014/0247729 A1* | 9/2014 | Sahu | H04W 52/0261 370/252 |
| 2015/0106640 A1* | 4/2015 | Brackman | G06F 1/3243 713/324 |
| 2016/0066300 A1* | 3/2016 | McCabe | G06F 1/3209 370/329 |
| 2016/0296840 A1 | 10/2016 | Kaewell et al. | |
| 2017/0272995 A1 | 9/2017 | Kim et al. | |
| 2018/0197508 A1 | 7/2018 | Chae et al. | |
| 2019/0197888 A1* | 6/2019 | DiFrancesco | G08G 1/0116 |
| 2020/0092844 A1* | 3/2020 | Lin | H04W 60/06 |

OTHER PUBLICATIONS

Extended European Search Report dated Jan. 4, 2022, issued in European Patent Application No. 20801834.1.

* cited by examiner

ELECTRONIC DEVICE FOR SWITCHING BETWEEN COMMUNICATION CHANNELS AND CONTROL METHOD THEREOF

CROSS-REFERENCE TO RELATED APPLICATION(S)

This application is based on and claims priority under 35 U.S.C. § 119(a) of a Korean patent application number 10-2019-0053882, filed on May 8, 2019, in the Korean Intellectual Property Office, the disclosure of which is incorporated by reference herein in its entirety.

BACKGROUND

1. Field

The disclosure relates to an electronic device and control method thereof. More particularly, the disclosure relates to an electronic device having a function of switching between communication channels to reduce heat production.

2. Description of Related Art

With the advance of mobile communication technologies, various types of electronic devices are being equipped with antennas. An antenna-equipped electronic device may be configured to connect to a $3^{rd}$ generation (3G), $4^{th}$ generation (4G), or $5^{th}$ generation (5G) network to communicate messages, pictures, videos, music files, and games with an external device. Recently, a large number of game applications have been operating by connection to an external device via a network to download game data for gameplay.

The above information is presented as background information only to assist with an understanding of the disclosure. No determination has been made, and no assertion is made, as to whether any of the above might be applicable as prior art with regard to the disclosure.

SUMMARY

An electronic device may establish a connection with a server providing a game application via a 3G, 4G (or long-term evolution (LTE)), or 5G network according to characteristics of the antenna of the electronic device. If the electronic device communicates with the server via the 5G network, it may be assigned a data rate 20 times faster than that expected with use of the 3G or 4G (or LTE) network, leading to quick receipt of a large volume of data.

However, this is likely to cause overheating of the electronic device, which entails performance degradation of processors and leads to failure of smooth progress of the game application and an inconvenience to a user.

Aspects of the disclosure are to address at least the above-mentioned problems and/or disadvantages and to provide at least the advantages described below. Accordingly, an aspect of the disclosure is to provide switching between communication channels to reduce heat production.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuitry including a first communication processor and a second communication processor, a sensor, at least one processor, and at least one memory configured to store instructions, executable by the at least one processor, for identifying an execution status of an application and a temperature of at least a part of the electronic device, deactivating the second communication processor based on the identified execution status of the application and the identified temperature, and activating the second communication processor based on network traffic being processed by the first communication processor being greater than a predetermined threshold.

In accordance with another aspect of the disclosure, a control method of an electronic device is provided. The control method includes executing an application, identifying an execution status of the application and a temperature of at least a part of the electronic device, deactivating a second communication processor based on the identified execution status of the application and the identified temperature, and activating the second communication processor based on network traffic being processed by a first communication processor being greater than a predetermined threshold.

In accordance with another aspect of the disclosure, a computer-readable storage medium is provided. The computer-readable storage medium stores a program for a computer to perform a control method, the program comprising instructions for identifying an execution status of an application and a temperature of at least a part of the electronic device, deactivating a second communication processor based on the identified execution status of the application and the identified temperature, and activating the second communication processor based on network traffic being processed by a first communication processor being greater than a predetermined threshold.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

The same reference numerals are used to represent the same elements throughout the drawings.

DETAILED DESCRIPTION

Figure 1:
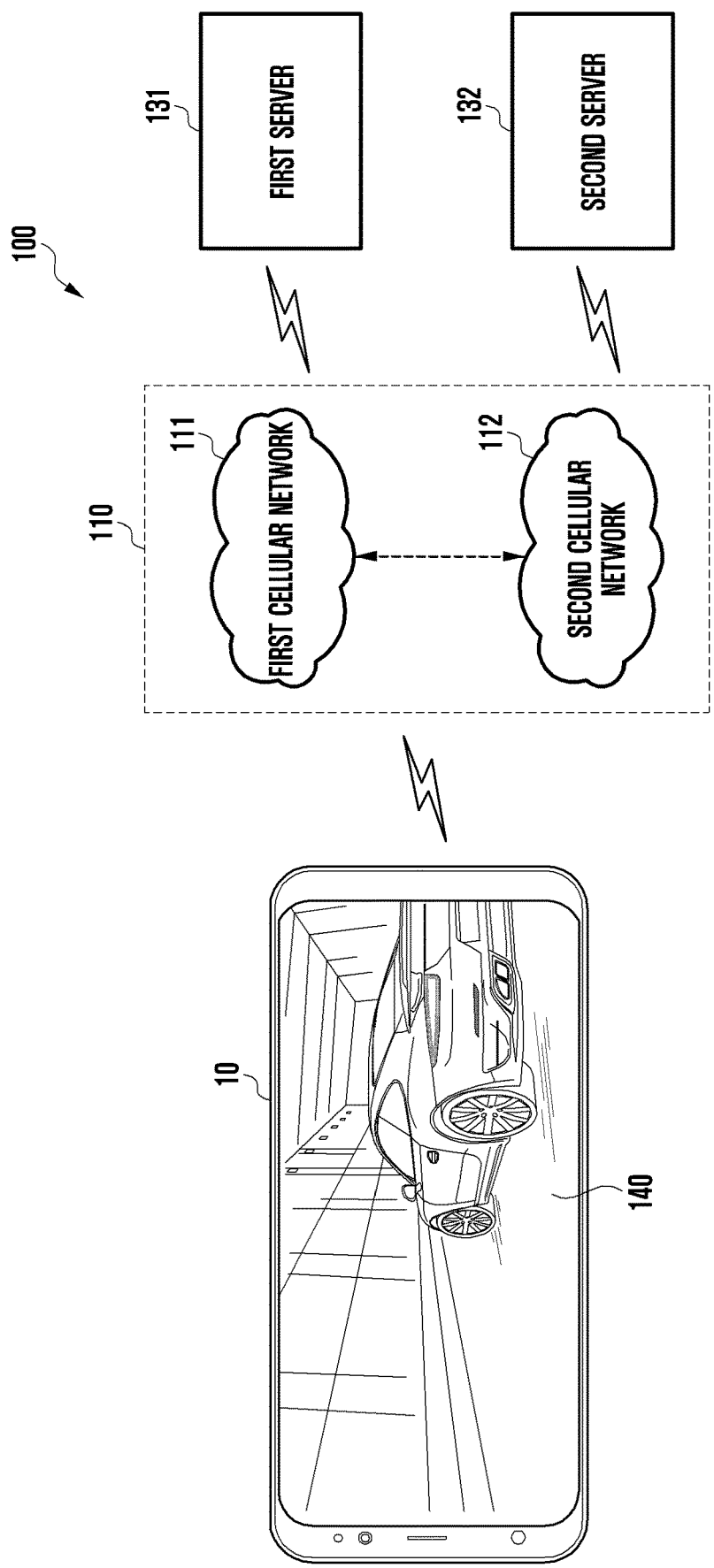
FIG. 1 is a diagram illustrating a situation where an electronic device on which an application is running in interoperation with an external server changes a network based on a status of the electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a diagram illustrating a situation where an electronic device on which an application is running in interoperation with an external server changes a network based on a status of the electronic device according to an embodiment of the disclosure.

Referring to FIG. 1, in diagram 100, an electronic device 10 may communicate data with an external device (e.g., first server 131 and second server 132) via a network 110 (e.g., first cellular network 111 and second cellular network 112). The first and second cellular networks 111 and 112 may differ in operating frequency band. For example, the first cellular network 111 may be one of a legacy network including $2^{nd}$ generation (2G), $3^{rd}$ generation (3G), and $4^{th}$ generation (4G) (or long-term evolution (LTE)) networks. The second network 112 may be a $5^{th}$ generation (5G) network.

Referring to FIG. 1, the electronic device 10 may execute an application. The application may be one of various application programs running on an operating system. Examples of the application may include various types of application programs such as a game application, a telephony application, a texting application, a navigation application, a music application, an alarm application, a schedule application, a system setting application, a web browser application, a social networking service (SNS) application, and a camera application. The electronic device 10 may download data from the external device (e.g., external server) to install the application. The electronic device 10 may also have applications installed by the manufacturer of the electronic device 10 at the manufacturing state.

According to an embodiment, the electronic device 10 may execute a game application 140, which runs in interoperation with an external server (e.g., first server 131 or second server 132). For example, the electronic device 10 may execute the game application in response to an external input (e.g., user input) requesting for execution of the game application 140 and establish a connection to the external server associated with the game application.

According to an embodiment, the first server 131 may be a server for data communication with the electronic device 10 in association with an application running on the electronic device 10. For example, in the case where the game application 140 is running on the electronic device 10, the first server 131 may communicate data associated with the game application with the electronic device 10. Examples of the data associated with the game application 140 may include at least one of background images of the game, game character images, statuses of the game character images, game-related music (sound effects and background music), game stages, statuses of the game stages, and icons to be displayed on a display. According to an embodiment, the game application 140 may have a mode for playing a game in interoperation with the first server 131.

According to an embodiment, the second server 132 may be a server for providing information related to the application running on the electronic device 10. The second server 132 may know the execution status of the application running on the electronic device 10 based on data received from the first server 131. For example, in the case where the game application server is executed in the electronic device 10, the second server 132 may transmit the previously received execution status of the game application 140 to the electronic device 10. The execution status of the application may be the information on the status of the execution of the application running on the electronic device 10 and may be determined based on a usage degree of resources of the electronic device 10 for executing the application. That is, the execution status may be sorted into two categories: high resource usage status and low resource usage status. For example, the resources may include processors, memories, a display, and a sensor module.

However, the situation is not limited to the above description. The second server 132 for providing the electronic device 10 with the application-related information may not exist depending on the application running on the electronic device 10.

According to an embodiment, the electronic device 10 may acquire the data associated with the application running on the electronic device 10. For example, the electronic device 10 may execute the game application 140 and receive character images, background images, and music corresponding to the game application 140 from the first server 131.

According to an embodiment, the electronic device 10 may acquire information on the execution status of the executed application. The application execution status may be determined based on the usage degree of resources of the electronic device for executing the application.

For example, the electronic device 10 may ascertain the game stage and character status of the running game application based on the game application-related data received from the first server 131 and determine the execution status of the application based on whether the usage degree of resources estimated from the game status and the character status is high or low. In this case, if the application execution status is the high resource usage status, this may be at least one of the cases where a plurality of characters appear or a plurality of input signals are capable of being input by the user. If the application execution status is the low resource usage status, this may be at least one of the cases where one character appears, previously stored data are read out for progress to the next episode, the character purchases an item, the character keeps still, or one or two input signals are input repetitively.

According to various embodiments, the electronic device 10 may receive information on the execution status of the game application from the second server. The electronic device 10 may acquire the information on the execution status of the game application from the game application that is running.

Figure 2:
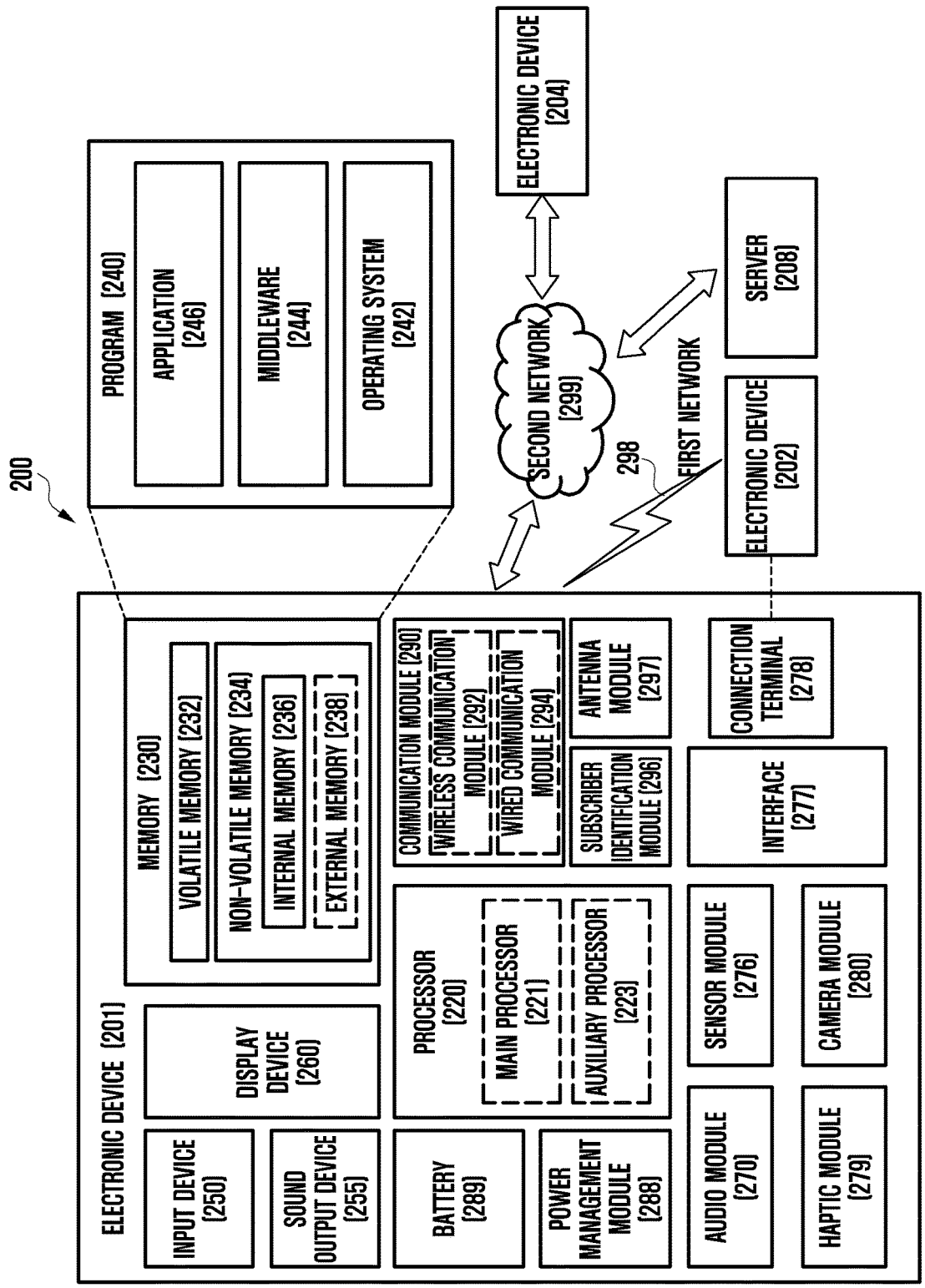
FIG. 2 is a block diagram illustrating an electronic device in a network environment according to an embodiment of the disclosure.

According to an embodiment, the electronic device 10 may ascertain (or detect) a temperature of at least part of the electronic device by means of the sensor module (e.g., sensor module 276 in FIG. 2). The components constituting the electronic device 10 may generate heat for various reasons.

According to an embodiment, the electronic device 10 may produce heat while the electronic device 10 communicates data with an external device via a network. For example, the electronic device 10 may establish a wireless communication channel with the first cellular network 111 for communication by means of a first communication processor of the electronic device 10. The electronic device 10 may also establish a wireless communication channel with the second cellular network 112 for data communication by means of a second communication processor of the electronic device 10. During the communication process, the first or second communication processor may produce heat. In this case, assuming the second cellular network 112 as a 5G network and the first cellular network 111 as a 2G, 3G, or 4G (or LTE) network, the second communication processor may produce more heat than the first communication processor.

According to an embodiment, the electronic device 10 may produce more heat in the case of using a high resolution display than that in the case of using a low resolution display for displaying an image. For example, a display having pixels 2560×1440 may produce more heat than a display having pixels of 1920×1080.

According to various embodiments, the greater the brightness of the display 11 is, the more electric current the electronic device 10 consumes and the more heat the electronic device 10 produces.

According to an embodiment, charging a battery of the electronic device 10 with power supplied by an external device may produce heat in the battery. Meanwhile, a quick charge function has become a popular feature for recently produced electronic devices. If the quick charge function is used for charging the battery of the electronic device 10, this may produce more heat and higher temperatures than using a normal charge function.

According to an embodiment, the processor of the electronic device 10 may produce more heat depending on the characteristics of an operating system of the electronic device. For example, the operating system of the electronic device 10 may run multiple applications at the same time. For example, the operating system may run multiple applications in such a way of displaying an execution screen of a first application on the display and simultaneously outputting audio sounds of a second application of which the execution screen is not displayed on the display. It may also be possible for the operating system to run multiple applications in such a way of displaying an execution screen of a first application on the display and simultaneously processing data of a second application to prepare for displaying the execution screen of the second application. It may also be possible for the operating system of the electronic device 10 to run multiple applications in such a way of controlling the electronic device 10 to periodically communicate data with an external device to update contents of a predetermined SNS application that is not being executed. Even in this case, the electronic device 10 may produce heat.

According to an embodiment, the electronic device 10 may produce more heat depending on the execution status of an application running on the electronic device 10. For example, the electronic device 10 may generate more heat in the case where multiple characters appear or multiple input signals are allowed to be input than in the case where one character appears or one or two input signals are repetitively input.

According to an embodiment, the electronic device 10 may deactivate the second communication processor based on the ascertained execution status and temperature.

Figure 3:
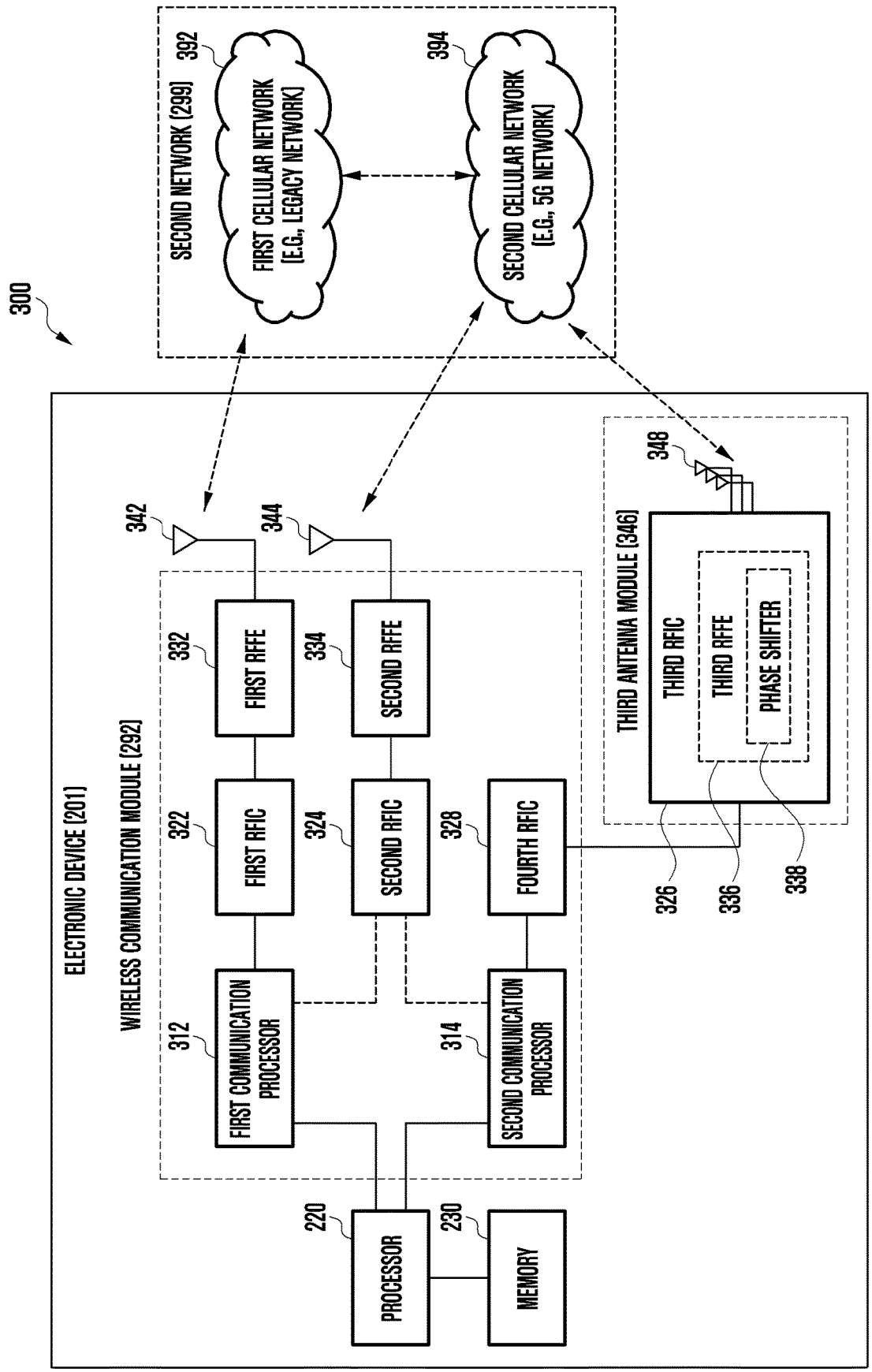
FIG. 3 is a block diagram illustrating an electronic device in a network environment including multiple cellular networks according to an embodiment of the disclosure.

For example, the electronic device 10 may include the first communication processor (e.g., first communication processor 312 in FIG. 3) and the second communication processor (e.g., second communication processor 314 in FIG. 3).

For example, the first communication processor may establish a wireless communication channel with the first cellular network 111 supporting 2G, 3G, or 4G (or LTE) communication. The second communication processor may establish a wireless communication channel with the second cellular network 112 supporting 5G communication. That is, the electronic device 10 may switch from the 5G communication to the 2G, 3G, or 4G (LTE) communication based on the application execution status and detected temperature. In this manner, the electronic device 10 may reduce its internal heat production.

For example, the electronic device 10 may detect an execution status of a game application in which a character repeats the same action, i.e., low resource usage status. The electronic device 10 may detect that the sensed temperature of the electronic device 10 is close to a predetermined value (e.g., in the range between 40° C. and 45° C.). In this case, the electronic device 10 may deactivate the second communication processor and simultaneously activate the first communication processor for data communication with the external device.

According to various embodiments, the electronic device 10 may control antenna modules with different frequency bands based on the application execution status and sensed temperature. For example, the electronic device 10 may be controlled to use an antenna operating in a frequency band below 6 gigahertz (GHz) (e.g., second antenna module 344 in FIG. 3) and an antenna operating in a frequency band between 6 GHz and 60 GHz (e.g., third antenna 348 in FIG. 3).

For example, if the execution status of the game application indicates the high resource usage status of the electronic device 10 or if the temperature of the electronic device 10 is close to the predetermined value (e.g., in the range between 40° C. and 45° C.), the electronic device 10 may deactivate the communication channel established by the antenna operating in the first frequency band (e.g., frequency band between 6 GHz and 60 GHz) and activate the communication channel established by the antenna operating in the second frequency band (e.g., frequency band below 6 GHz).

A wireless communication module including the first and second communication processors is described later with reference to FIGS. 2 and 3.

According to an embodiment, the electronic device 10 may activate the second communication processor in the case where the network traffic being processed by the first communication processor is greater than a predetermined threshold.

The electronic device 10 may measure the network traffic in the course of data communication with the first server 131 or the second server 132 via a 2G, 3G, or 4G (or LTE) communication network. For example, if the network traffic becomes equal to or greater than a predetermined threshold (e.g., 400 megabyte (mb)~500 mb), the electronic device 10 may activate a connection to the second cellular network 112 for 5G communication.

For example, if multiple characters appear in the game application running on the electronic device 10, the electronic device 10 may detect that the game application transitions to an execution status requiring download of a high volume of data. The electronic device 10 may activate the second cellular network 112 corresponding to 5G communication for receiving the large volume of data quickly from the first server 131.

In this case, the electronic device 10 may determine whether the electronic device 10 is located in an area available for access to a 5G network. For example, if the electronic device 10 is located in an area where the connection to the second cellular network 112 is frequently broken, it may maintain the connection to the first cellular network 111 for data communication.

According to various embodiments, the electronic device 10 may control the antenna modules operating in different frequency bands based on the ascertained application execution status and temperature. For example, if it is determined that the execution status of the game application indicates the necessity of a download of a high volume of data, the electronic device 10 may deactivate the communication channel established by means of the antenna operating in the second frequency band (e.g., frequency band below 6 GHz) and activate a communication channel established by means of the antenna operating in the first frequency band (e.g. frequency band between 6 GHz and 60 GHz).

According to various embodiments, the second communication processor may operate under the control of the second communication processor. For example, the second communication processor may be activated or deactivated under the control of the first communication processor staying in the activated state.

For example, the electronic device 10 may deactivate the second communication processor under the control of the first communication processor based on the ascertained application execution status and temperature. Deactivating the second communication processor may mean transitioning the second communication processor to a maximum power-saving status.

In this case, the electronic device 10 may control the first communication processor such that a signal (or data) received form the second cellular network 112 via the second antenna module (e.g., second antenna module 344 in FIG. 3) is processed by a second radio frequency front end (RFFE) (e.g., second RFFE 334 in FIG. 3) and a second radio frequency integrated circuit (RFIC) (e.g., second RFIC 324 in FIG. 3) and sent to the second communication processor.

The electronic device 10 may also activate the second communication processor under the control of the first communication processor in the case where the network traffic being processed by the first communication processor for execution of an application is greater than a predetermined threshold.

According to an embodiment, the electronic device 10 may deactivate the first communication processor and activate the second communication processor. The electronic device 10 may maintain the data communication via the first communication processor, even when the second communication processor is activated, until the data communication continuity is guaranteed for the processing operation of the second communication processor.

For example, the electronic device 10 may check the game data communication history between the first and second communication processors and verify the continuity of the game data communicated with the first server 131. The electronic device 10 may deactivate the first communication processor and then proceed to activate the second communication processor for game data communication with the first server 131. That is, the electronic device 10 may control the first and second communication processors such that the data communication operation with the first communication processor and the data communication operation with the second communication processor are overlapped.

According to this embodiment, the electronic device is capable of switching between communication channels dynamically based on the temperature status of the electronic device 10 and the execution status of the application running on the electronic device 10, thereby achieving the goals of reducing heat production of the electronic device and maintaining performance of an application running on the electronic device.

FIG. 2 is a block diagram illustrating an electronic device in a network environment according to an embodiment of the disclosure. The electronic device may include the electronic device 10 in FIG. 1.

Referring to FIG. 2, in a network environment 200 an electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 (e.g., dynamic random-access memory (DRAM), static random-access memory (SRAM) or synchronous dynamic random-access memory (SDRAM)) may include the volatile memory 232 or the non-volatile memory 234. The non-volatile memory 234 includes internal memory 236 or external memory 238.

The program 240 may be stored in the memory 230 as software, and may include, for example, an operating system (OS) 242, middleware 244, or an application 246 (e.g., application program).

The input device 250 may receive a command or data to be used by other component (e.g., the processor 220) of the electronic device 201, from the outside (e.g., a user) of the electronic device 201. The input device 250 may include, for example, a microphone, a mouse, or a keyboard.

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™ wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module may include an emitter of a conductor or conductor pattern formed on a substrate (e.g., printed circuit board (PCB)). According to an embodiment, the antenna module 297 may include one or more antennas, and, therefrom, at least one antenna appropriate for a communication scheme used in the communication network, such as the first network 298 or the second network 299, may be selected, for example, by the communication module 290 (e.g., the wireless communication module 292). The signal or the power may then be transmitted or received between the communication module 290 and the external electronic device via the selected at least one antenna. According to an embodiment, other components (e.g., RFIC) may also be formed as parts of the antenna module 297 in addition to the emitter.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

FIG. 3 is a block diagram illustrating an electronic device in a network environment including multiple cellular networks according to an embodiment of the disclosure.

Referring to FIG. 3, in a network environment 300, the electronic device 201 may include a first communication processor 312, a second communication processor 314, a first radio frequency integrated circuit (RFIC) 322, a second RFIC 324, a third RFIC 326, a fourth RFIC 328, a first radio frequency front end (RFFE) 332, a second RFFE 334, a first antenna module 342, a second antenna module 344, and an antenna 348. The electronic device 201 may also include a processor 220 and a memory 230. The second network 299 may include a first cellular network 392 and a second cellular network 394. According to an alternative embodiment, the electronic device 201 may include at least one of the components depicted in FIG. 2, and the second network 299 may further include at least one other network. According to an embodiment, the first communication processor 312, the second communication processor 314, the first RFIC 322, the second RFIC 324, the fourth RFIC 328, the first RFFE 332, and the second RFFE 334 may constitute at least part of the wireless communication module 292. According to an alternative embodiment, the fourth RFIC 328 may be omitted or constitute part of the third RFIC 326.

The first communication processor 312 may establish a communication channel within a band designated to the first cellular network 392 and support a legacy network communication on the established communication channel According to various embodiments, the first cellular network may be a legacy network such as 2G, 3G, and 4G (or LTE) networks. The second communication processor 314 may establish a communication channel in a designated band (e.g., about 6 GHz~about 60 GHz) among bands for radio communication with the second cellular network and support 5G network communication on the established communication channel According to various embodiments, the second cellular network 394 may be a 5G network defined by 3rd generation partnership project (3GPP). Additionally, according to an embodiment, the first communication processor 312 or the second communication processor 314 may establish a communication channel in another designated band (e.g., below 6 GHz) among bands for radio communication with the second cellular network 394 and support 4G network communication on the established communication channel According to an embodiment, the first and second communication processors 312 and 314 may be implemented in the form of a single chip or a single package. According to various embodiments, the first communication processor 312 or the second communication processor 314 may be implemented along with the processor 220, the auxiliary processor 223, or the communication module 290 in a single chip or a single package. According to an embodiment, the first and second communication processor 312 and 314 may be connected with each other directly through an interface (not shown) or indirectly to transmit/receive data or control signals in a unidirectional or bidirectional manner.

For transmission, the first RFIC 322 may convert a baseband signal generated by the first communication processor 312 to a radio frequency (RF) signal in the range from about 700 megahertz (MHz) to about 3 GHz for the first cellular network 392 (e.g., legacy network). For reception, an RF signal from the first cellular network 392 (e.g., legacy network) may be received by an antenna (e.g., first antenna module 342) and preprocessed by an RFFE (e.g., first RFFE 332). The first RFIC 322 may convert the preprocessed RF signal to a baseband signal that can be processed by the first communication processor 312.

For transmission, the second RFIC 324 may convert the baseband signal generated by the first communication processor 312 or the second communication processor 314 to an RF signal for use in the second cellular network (hereinafter, referred to as Sub6 RF signal). For reception, a 5G Sub6 RF signal from the second cellular network 394 (e.g., 5G network) may be received by an antenna (e.g., second antenna module 344) and preprocessed by an RFFE (e.g., second RFFE 334). The second RFIC 324 may convert the preprocessed 5G Sub6 RF signal to a baseband signal that can be processed by one of the first and second communication processor 312 and 314.

The third RFIC 326 may convert the baseband signal generated by the second communication processor 314 to an RF signal of a 5G Above6 band (e.g., about 6 GHz~about 60 GHz) (hereinafter, 5G Above6 RF signal) for use in the second cellular network 394 (e.g., 5G network). For reception, a 5G Above6 RF signal from the second cellular network 394 (e.g., 5G network) may be received by an antenna (e.g., antenna 348) and preprocessed by the third RFFE 336. The third RFIC 326 may convert the preprocessed 5G Above6 RF signal to a baseband signal that can be processed by the second communication processor 314. According to an embodiment, the third RFFE 336 may constitute part of the third RFIC 326.

According to an embodiment, the electronic device 201 may include the fourth RFIC 328 formed independently of or as at least part of the third RFIC 326. In this case, the fourth RFIC 328 may convert the baseband signal generated by the second communication processor 314 to an intermediate frequency (IF) band (e.g., about 9 GHz~about 11 GHz) signal (hereinafter, referred to as IF signal) and send the IF signal to the third RFIC 326. The third RFIC 326 may convert the IF signal to a 5G Above6 RF signal. For reception, a 5G Above6 RF signal from the second cellular network 394 (e.g., 5G network) may be received by an antenna (e.g., antenna 348) and converted to an IF signal by the third RFIC 326. The fourth RFIC 328 may convert the IF signal to a baseband signal that can be processed by the second communication processor 314.

According to an embodiment, the first and second RFICs 322 and 324 may constitute at least part of a single chip or a signal package. According to an embodiment, the first and second RFFEs 332 and 334 may constitute at least part of a single chip or a single package. According to an embodiment, at least one of the first and second antenna modules 342 and 344 may be omitted or combined with another antenna module to process RF signals in the corresponding bands.

According to an embodiment, the third RFIC 326 and the antenna 348 may be arranged on the same substrate as the third antenna module 346. For example, the wireless communication module or the processor 220 may be arranged on a first substrate (e.g., main PCB). In this case, the third antenna module 346 may be formed in such a way of arranging the third RFIC 326 at a region (e.g., bottom surface) of a second substrate (e.g., sub PCB) in separation from the first substrate and the antenna 348 at another region (e.g., top surface) of the second substrate. By arranging the third RFIC 326 and the antenna 348 on the same substrate, it may be possible to reduce the length of a transmission line between the third RFIC 326 and the antenna 348. This makes it possible to reduce loss (attenuation) of signals in a high frequency band (e.g., about 6 GHz~about 60 GHz) for 5 network communication on the transmission line. This means that the electronic device 201 can improve the quality and speed of communication with the second cellular network 394 (e.g., 5G network).

According to an embodiment, the antenna 348 may be configured in the form of an antenna array including a plurality of antenna elements for beamforming. In this case, the third RFIC 326 may include, as part of the third RFFE 336, a plurality of phase sifters 338 corresponding to the antenna elements. For transmission, each phase shifter 338 may shift the phase of a 5G Above6 RF signal to be transmitted to the outside (e.g., 5G network base station) of the electronic device 201 via a corresponding antenna element. For reception, the phase shifters 338 may shift the phases of 5G Above6 RF signals received from the outside via corresponding antenna elements so as to be identical or substantially identical with each other. This makes it possible for the electronic device to perform beamforming for transmitting and receiving signals to and from the outside.

The second cellular network 394 (e.g., 5G network) may operate independently of (e.g., standalone (SA)) or in association with (e.g., non-standalone (NSA)) the first cellular network 392 (e.g., legacy network). For example, a 5G network may include access networks (e.g., 5G radio access networks (RANs) or next generation RANs (NG RANs)) with the exception of a core network (e.g., N core). In this case, the electronic device 201 may access the 5G RAN to connect to an external network (e.g., Internet) under the control of a core network of a legacy system (e.g., evolved packet core (EPC). The protocol information for communication with the legacy network (e.g., LTE protocol information) and the protocol information for communication with the 5 network (e.g., New Radio (NR) protocol information) may be stored in the memory 330 such that other components (e.g., processor 220, first communication processor 312, or second communication processor 314) can access the information.

Figure 4:
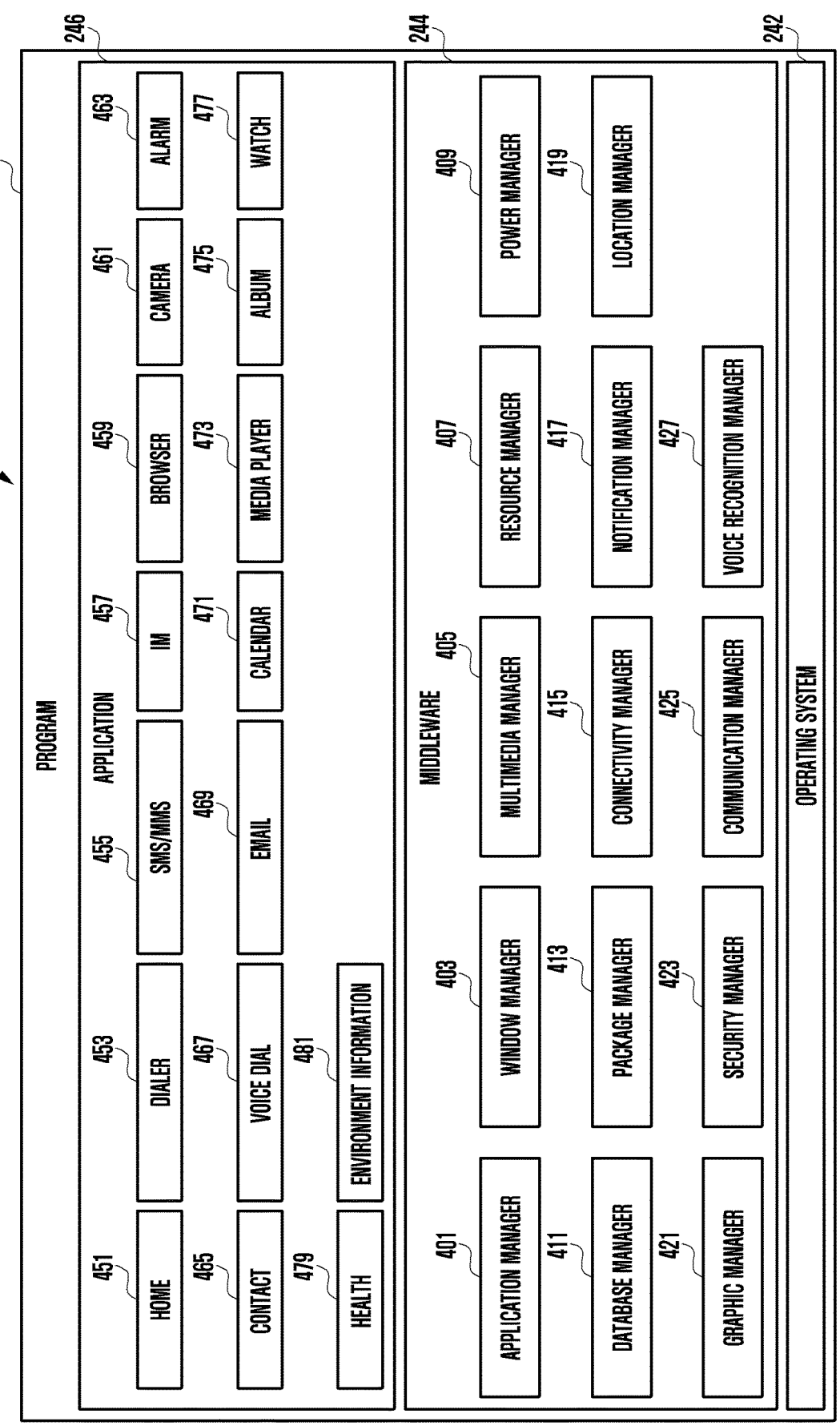
FIG. 4 is a block diagram illustrating a program according to an embodiment of the disclosure.

FIG. 4 is a block diagram illustrating a program according to an embodiment of the disclosure.

Referring to FIG. 4, in a diagram 400, the program 240 may include an operating system (OS) 242 to control one or more resources of the electronic device 201, middleware 244, or an application 246, executable in the OS 242. The OS 242 may include, for example, Android™, iOS™, Windows™, Symbian™, Tizen™, or Bala™. At least part of the program 240, for example, may be pre-loaded on the electronic device 201 during manufacture, or may be downloaded from or updated by an external electronic device (e.g., the electronic device 202 or 204, or the server 208) during use by a user.

The OS 242 may control management (e.g., allocating or deallocation) of one or more system resources (e.g., process, memory, or power source) of the electronic device 201. The OS 242, additionally or alternatively, may include one or more driver programs to drive other hardware devices of the electronic device 201, for example, the input device 250, the sound output device 255, the display device 260, the audio module 270, the sensor module 276, the interface 277, the haptic module 279, the camera module 280, the power management module 288, the battery 289, the communication module 290, the subscriber identification module 296, or the antenna module 297.

The middleware 244 may provide various functions to the application 246 such that a function or information provided from one or more resources of the electronic device 201 may be used by the application 246. The middleware 244 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 246. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 246 or a memory space of the memory 230. The power manager 409, for example, may manage the capacity, temperature, or power of the battery 289, and determine or provide related information to be used for the operation of the electronic device 201 based at least in part on corresponding information of the capacity, temperature, or power of the battery 289. According to an embodiment, the power manager 409 may interwork with a basic input/output system (BIOS) (not shown) of the electronic device 201.

The database manager 411, for example, may generate, search, or change a database to be used by the application 246. The package manager 413, for example, may manage installation or update of an application that is distributed in the form of a package file. The connectivity manager 415, for example, may manage a wireless connection or a direct connection between the electronic device 201 and the external electronic device. The notification manager 417, for example, may provide a function to notify a user of an occurrence of a specified event (e.g., an incoming call, message, or alert). The location manager 419, for example, may manage locational information on the electronic device 201. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 201. The voice recognition manager 427, for example, may transmit a user's voice data to the server 208, and receive, from the server 208, a command corresponding to a function to be executed on the electronic device 201 based at least in part on the voice data, or text data converted based at least in part on the voice data. According to an embodiment, the middleware 244 may dynamically delete some existing components or add new components. According to an embodiment, at least part of the middleware 244 may be included as part of the OS 242 or may be implemented as another software separate from the OS 242.

The application 246 may include, for example, a home 451, a dialer 453, a short message service (SMS)/multimedia messaging service (MMS) 455, an instant message (IM) 457, a browser 459, a camera 461, an alarm 463, a contact 465, a voice recognition 467, an email 469, a calendar 471, a media player 473, an album 475, a watch 477, a health 479 (e.g., for measuring the degree of workout or biometric information, such as blood sugar), or environmental information 481 (e.g., for measuring air pressure, humidity, or temperature information) application. According to an embodiment, the application 246 may further include an information exchanging application (not shown) that is capable of supporting information exchange between the electronic device 201 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 201 to the external electronic device. Additionally or alternatively, the notification relay application may receive notification information from the external electronic device and provide the notification information to a user of the electronic device 201.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

According to various embodiments, the electronic device 10 may download an application from an external device for installation. In this case, the electronic device 10 may install the application downloaded from the external device.

For example, if a game application is downloaded and installed, the electronic device 10 may install a game launcher and game tools for supporting the game application in the application 246.

For example, the game launcher may identify and manage game applications among the installed applications. For example, the electronic device 10 may identify the category of the application in the course of downloading the application from an app store or by requesting to a server (e.g., first server 131) for identification of the installed application with a game application.

According to an embodiment, the game launcher may provide a user interface related to settings of the game application. For example, the game launcher may provide the user interface 1110 that is described later referring to FIG. 11.

For example, a game tool may be an application being executed along with the game application when the game application is executed. The game tool may support tasks for changing the settings of a game or capturing a game screen of the game application that is running.

According to an embodiment, in the case of capturing the execution screen of the game tool, the game tool may request to the processor 220 for a communication channel to be maintained with the second cellular network (e.g., second cellular network 394 in FIG. 3) in order to prevent the screen from pausing.

In the case of downloading and installing the game application, the electronic device may also install a game manager for supporting the game application, the game launcher, the game tools, or a game analyzer, a game analyzer, or a performance manager in the middleware 244.

For example, the game manager may manage installation and deletion of a game application in the electronic device 10.

For example, the game analyzer may communicate with the game server (e.g., first server 131 in FIG. 1) to monitor the status of the game in progress in the electronic device 10. The game analyzer may determine whether further data communication is necessary based on the execution status of the game application.

According to various embodiments, the game analyzer may identify an IP address of a server that wants to transmit data to the electronic device 10 and change the communication channel. For example, if it is identified that the first server 131 enters a different path, (e.g., if it is identified that a high volume of data may be downloaded) the game analyzer may request to the processor 220 for switching the communication channel from the first cellular network 392 to the second cellular network 394.

For example, the performance manager may request to the processor 220 for switching the communication channel from the second cellular network 394 to the first cellular network 392 based on heat production information acquired from the sensor module (e.g., sensor module 276 in FIG. 2).

Figure 5:
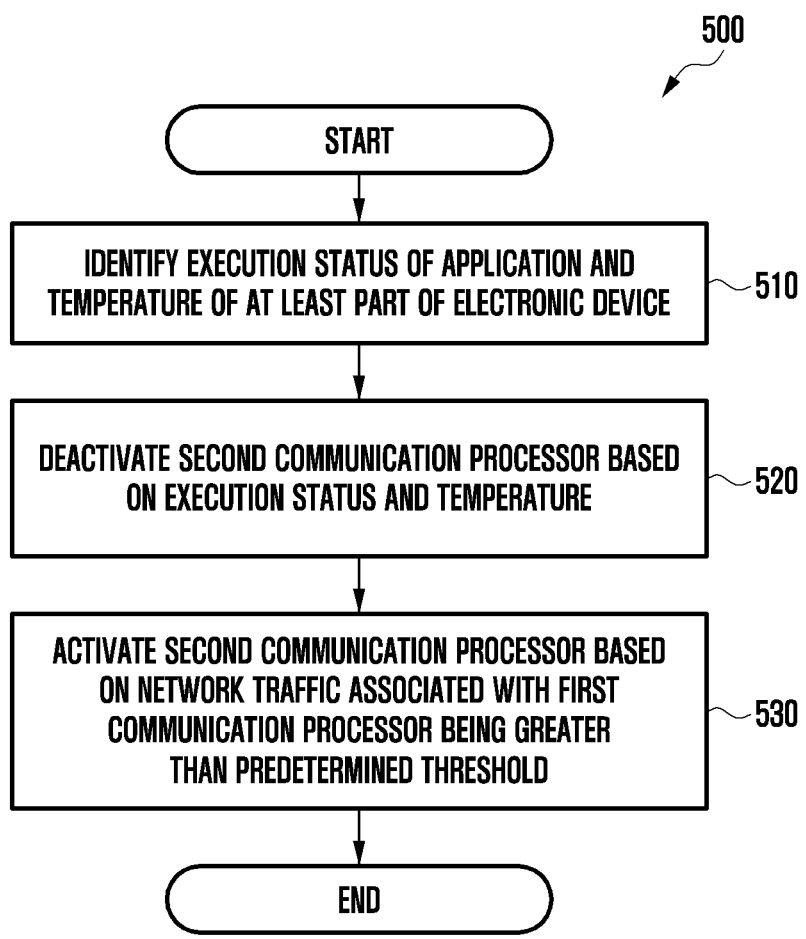
FIG. 5 is a flowchart illustrating a procedure for switching between networks based on a status of an electronic device on which an application is running in interoperation with an external server according to an embodiment of the disclosure.

FIG. 5 is a flowchart illustrating a procedure for switching between networks based on a status of an electronic device on which an application is running in interoperation with an external server according to an embodiment of the disclosure.

Referring to FIG. 5, in a method 500, at operation 510, the electronic device 10 may execute an application and ascertain an execution status of the application and a temperature of at least part of the electronic device 10.

For example, the electronic device 10 may execute a game application in response to an external input (e.g., user input) requesting for execution of the game application and communicate with an external server (e.g., first server 131 or second server 132 in FIG. 1) related to the game application.

For example, if the game application is executed on the electronic device 10, the electronic device 10 may receive data corresponding to the game application from the first server 131. For example, the data corresponding to the game application may include at least one of background images, character images, and music of the game.

For example, if the game application is executed on the electronic device 10, the electronic device 10 may receive data related to the execution status of the game application from the second server 132, the data being previously transmitted from the first server 131 to the second server 132.

According to various embodiments, the electronic device 10 may acquire the information on the execution status of the game application from the second server 132. For example, the second server may ascertain an execution status of an application running on the electronic device 10 based on data that was previously acquired from the first server 131.

The electronic device 10 may also ascertain the execution status of the game application from the game application running thereon.

According to an embodiment, the electronic device 10 may sense the temperature of at least part of the electronic device 10.

For example, the electronic device 10 may sense the heat produced by a communication processor in the course of communicating data via a cellular network. The electronic device 10 may also sense the heat produced by a display.

According to various embodiments, the electronic device 10 may sense the heat produced by a battery in the course of receiving power supply from the outside. The electronic device 10 may also sense the heat produced by the processor in the course of running a plurality of applications by the nature of the characteristics of the operating system. The electronic device 10 may also sense the heat produced by the processor according to the execution status of the application that is running.

At operation 520, the electronic device 10 may deactivate the second communication processor based on the execution status and temperature.

For example, the electronic device 10 may switch from a 5G communication mode being activated by the second communication processor to a 2G, 3G, or 4G (or LTE) communication mode being activated by the first communication processor based on the execution status of the application and the sensed temperature.

At operation 530, the electronic device 10 may activate the second communication processor based on the assumption that the network traffic being processed by the first communication processor is greater than a predetermined threshold.

For example, if it is determined that the network traffic is higher than a predetermined threshold in the course of communicating data related to the actions of multiple game characters, the electronic device 10 may switch from the 2G, 3G, or 4G (or LTE) communication mode being activated by the first communication processor to the 5G communication mode being activated by the second communication processor.

According to an alternative embodiment, the electronic device 10 may control the first and second communication processors independently to be each activated or deactivated. The electronic device 10 may also control the first communication processor to activate or deactivate the second communication processor.

For example, the electronic device 10 may activate or activate the second communication processor at operation 520 or 530 independently of the first communication processor. The electronic device 10 may also control the first communication processor to activate or deactivate the second communication processor.

Figure 6:
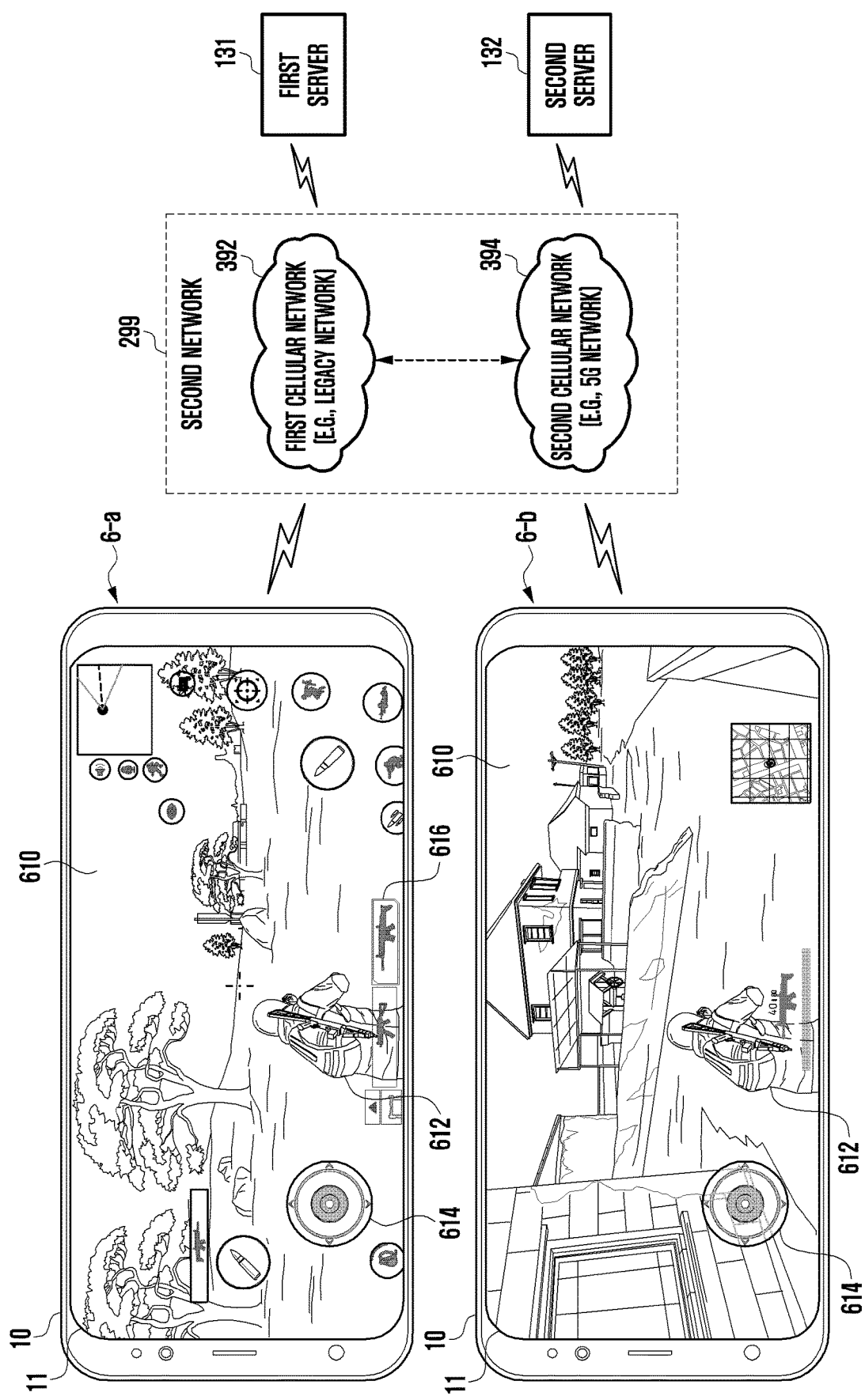
FIG. 6 is a diagram illustrating a situation where an electronic device switches from one communication channel to another in response to an external input according to an embodiment of the disclosure.

FIG. 6 is a diagram illustrating a situation where an electronic device switches from one communication channel to another in response to an external input according to an embodiment of the disclosure.

Referring to FIG. 6, the electronic device 10 may execute a game application 610 and display an execution screen of the game application on a display 11. The electronic device 10 may execute the game application in the course of communicating data with the first server 131 via the second network 299.

According to an embodiment, the electronic device 10 may ascertain an execution status of the application running thereon.

For example, the electronic device may acquire data corresponding to the game application 610 from the first server 131 and ascertain the execution status based on the data. The electronic device 10 may also acquire the acquired data corresponding to the game application from the game application running thereon and ascertain the execution status based on the acquired data. The electronic device 10 may also receive information on the execution status of the game application from the second server 132.

As denoted by reference number 6-a of FIG. 6, the electronic device 10 may display a battle scene of a character 612 on the display 11. The electronic device 10 may also display together various kinds of icons (e.g., a character facing direction adjustment icon 614 and an item icon 616 indicating the item owned by the character). Each of the icons may be provided to activate a predetermined function in response to a user's selection made thereon.

The electronic device 10 may identify the battle scene of the character 612 as a high resource usage status of the electronic device 10 based on the status of the character changing its facing direction continuously in response to a user input and the number of icons (e.g., 3 or more icons) with which the user may make an input.

The electronic device 10 may communicate data with the first server 131 via the second cellular network 394. For example, the electronic device 10 may receive data necessary for the battle scene (e.g., background image, background music, sound effects, and images of other necessary objects) via the second cellular network 394.

According to an embodiment, the electronic device 10 may receive data necessary after the end of the battle scene of the character 612 (e.g., background image and background music following the battle scene) in advance via the second cellular network 394.

As denoted by reference number 6-b of FIG. 6, the electronic device 10 may display a scene in which the character 612 moves in a direction. For example, the electronic device 10 may display the scene in which the character 612 moves in a direction after the battle scene as denoted by reference number 6-a of FIG. 6 ends.

The electronic device 10 may identify the scene in which the character 612 moves as a low resource usage status of the electronic device 10 based on the status of the character 612 having not many directions to move and a small number of icons (e.g., 2 or less icons) with which the user can make an input.

The electronic device 10 may switch the communication channel to the first cellular network 392 based on the identified execution status and communicate data corresponding to the game application 610 with the first server 131. In this case, the electronic device 10 may allow the game application to progress with the data received in advance via the second cellular network 394 in the state as denoted by reference number 6-a of FIG. 6.

As described in the above disclosed embodiment, the electronic device 10 may adaptively switch between multiple cellular networks for data communication based on a user's input frequency in association with the application running on the electronic device 10.

Figure 7:
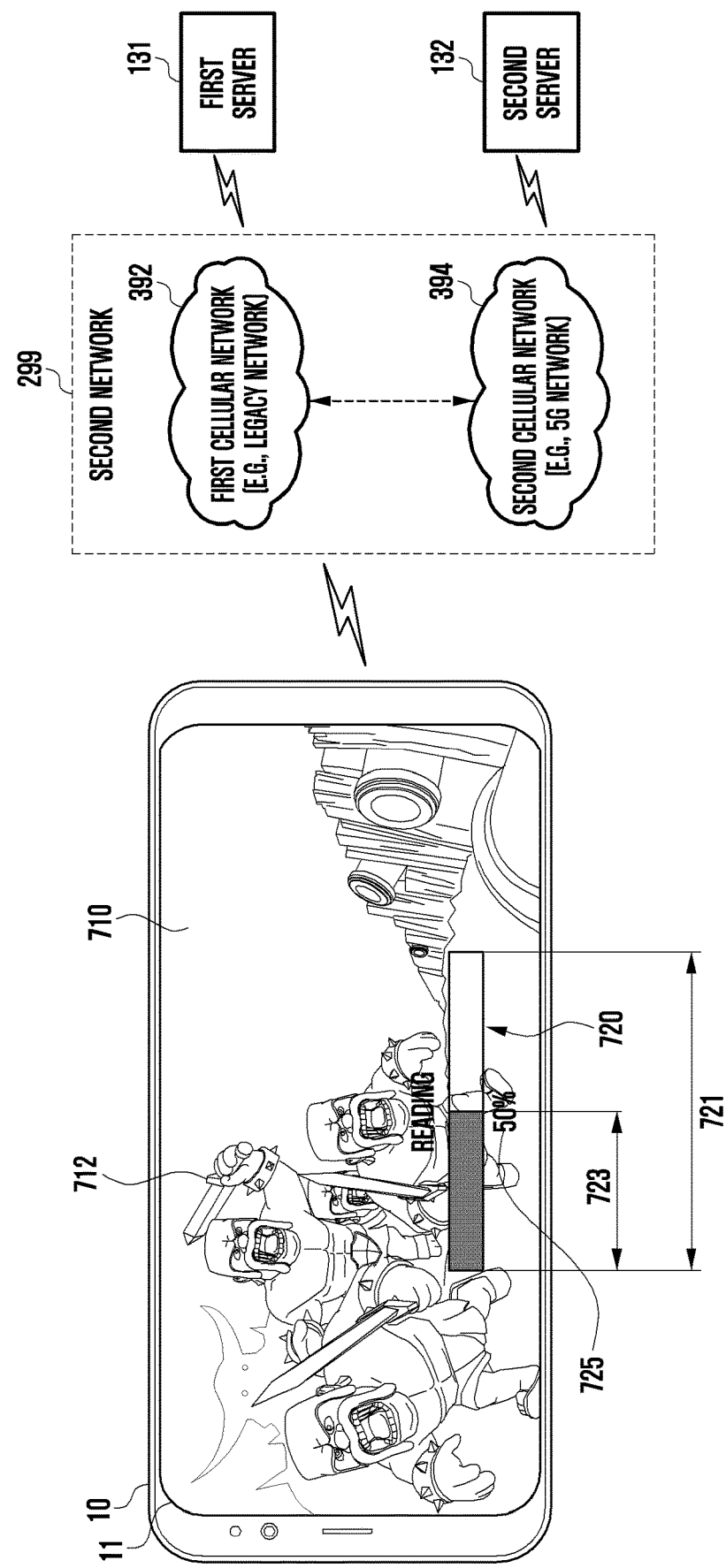
FIG. 7 is a diagram illustrating a situation where an electronic device switches from one communication channel to another based on internally-stored data loading according to an embodiment of the disclosure.

FIG. 7 is a diagram illustrating a situation where an electronic device switches from one communication channel to another based on internally-stored data loading according to an embodiment of the disclosure.

Referring to FIG. 7, the electronic device 10 may execute a game application 710 and display an execution screen of the game application 710 on a display. The electronic device 10 may execute the game application 710 in the course of communicating data with the first server 131 via the second network 299.

According to an embodiment, the electronic device 10 may ascertain an execution status of the game application 710 based on game application data provided by the first server 131 or the game application 710. The electronic device 10 may also receive information on the execution status of the game application 710 from the second server 132.

Referring to FIG. 7, the electronic device 10 may display a screen showing the progress of loading data for execution of the game application on the display 11, the data being read from a memory.

For example, the electronic device 10 may display an image 712 representing the game application 710 on the display 11. The electronic device 10 may display a progress bar 720 indicating the progress of reading data for executing the game application 710. For example, the progress bar 720 may indicate the progress status 723 on a complete progress bar 721 in the form of a rod. The electronic device 10 may display the progress status with a percentage 725. However, how the electronic device 10 displays the progress status of data reading is not limited to the above described manner.

The electronic device 10 may identify reading the data for execution of the game application 710 as a situation of communicating a large volume of data with the first server 131. The electronic device 10 may switch the communication channel to the first cellular network based on the identified execution status and communicate data corresponding to the game application 710 with the first server.

As described in the above disclosed embodiment, the electronic device 10 may adaptively switch between multiple cellular networks for data communication based on previously stored data corresponding to the application.

Figure 8:
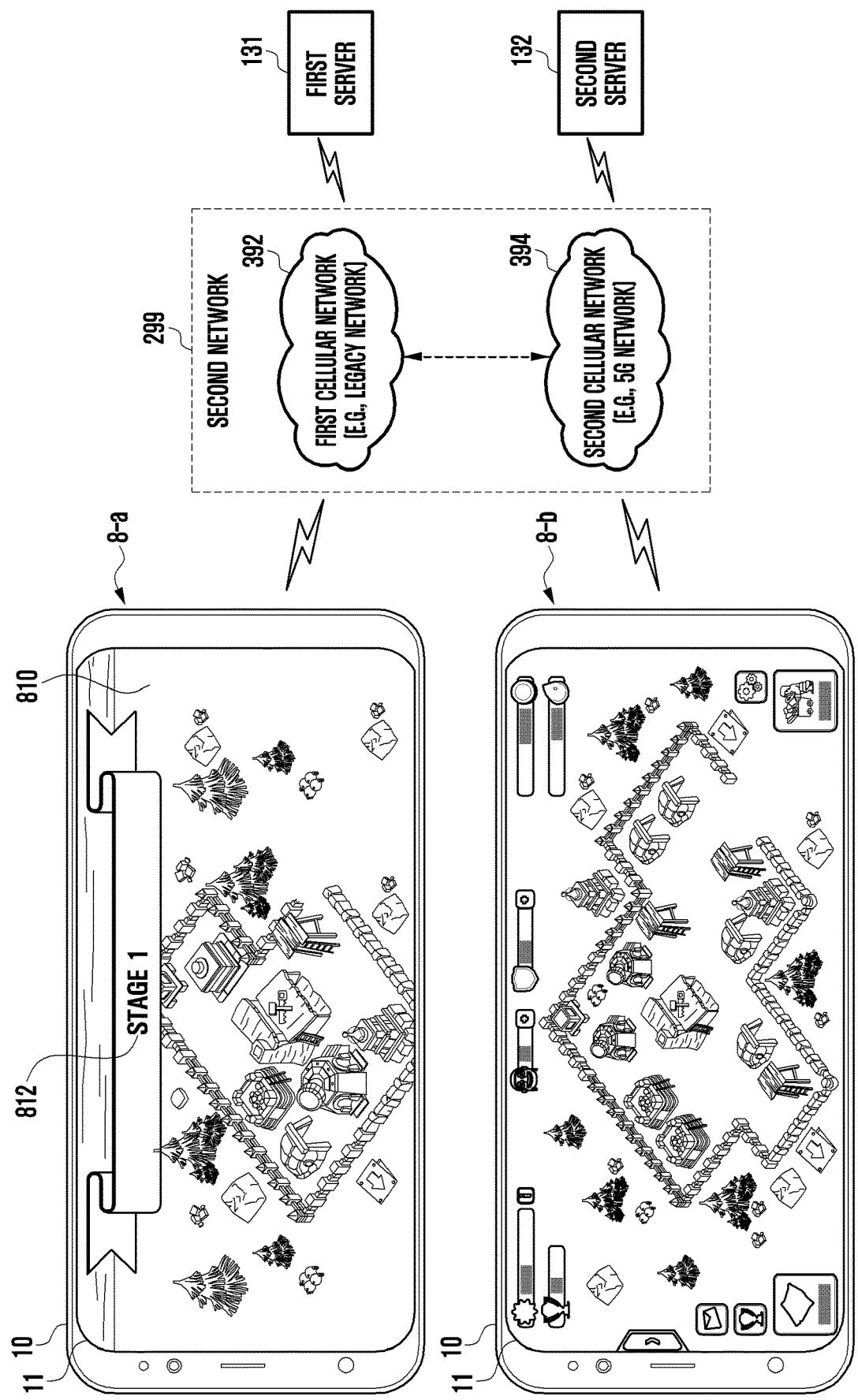
FIG. 8 is a diagram illustrating a situation where an electronic device receives data in advance through a communication channel and switches from the communication channel to another communication channel according to an embodiment of the disclosure.

FIG. 8 is a diagram illustrating a situation where an electronic device receives data in advance through a communication channel and switches from the communication channel to another communication channel according to an embodiment of the disclosure.

Referring to FIG. 8, the electronic device 10 may execute an application program 810 and display an execution screen of the game application 810 on a display 11. The electronic device 10 may execute the game application 810 in the course of communicating data with the first server 131 via the second network 299.

According to an embodiment, the electronic device 10 may ascertain an execution status of the game application 810 based on game application data provided by the first server 131 or the game application 810. The electronic device 10 may also receive information on the execution status of the game application 810 from the second server 132.

As denoted by reference number 8-*a* of FIG. 8, the electronic device 10 may receive data corresponding to the game application 810 via the second cellular network 394. For example, the electronic device 10 may receive data necessary to progress to "STAGE 1" 812 via the second cellular network 394. In this case, the electronic device 10 may receive and store all data necessary to progress to "STAGE 1" 812 at one time.

According to an embodiment, the electronic device 10 may receive data via the second cellular network 394 at a speed about 20 times the speed that data is received via the first cellular network 392. Accordingly, it may be possible to reduce to some extent the time required for the game application to progress, even though the electronic device 10 receives all data necessary for the game application to progress to "STAGE 1" 812 via the second cellular network 394.

As denoted by reference number 8-*b* of FIG. 8, the electronic device 10 may start the game to progress corresponding to "STAGE 1" 812. According to an embodiment, the electronic device 10 may switch the communication channel to the first cellular network 392 and control the game to progress based on the previously store data necessary to progress to "Stage 1" 812. According to various embodiments, if it is determined that there is further data that is needed to progress to "Stage 1" 812, the electronic device 10 may switch the communication channel to the second cellular network 394 to request to the first server 131 for the data.

As described in the above disclosed embodiment, the electronic device 10 may receive data in advance through a communication channel having a high data rate and switch from the communication channel to another communication channel producing low heat based on a state of progress of the game application.

Figure 9:
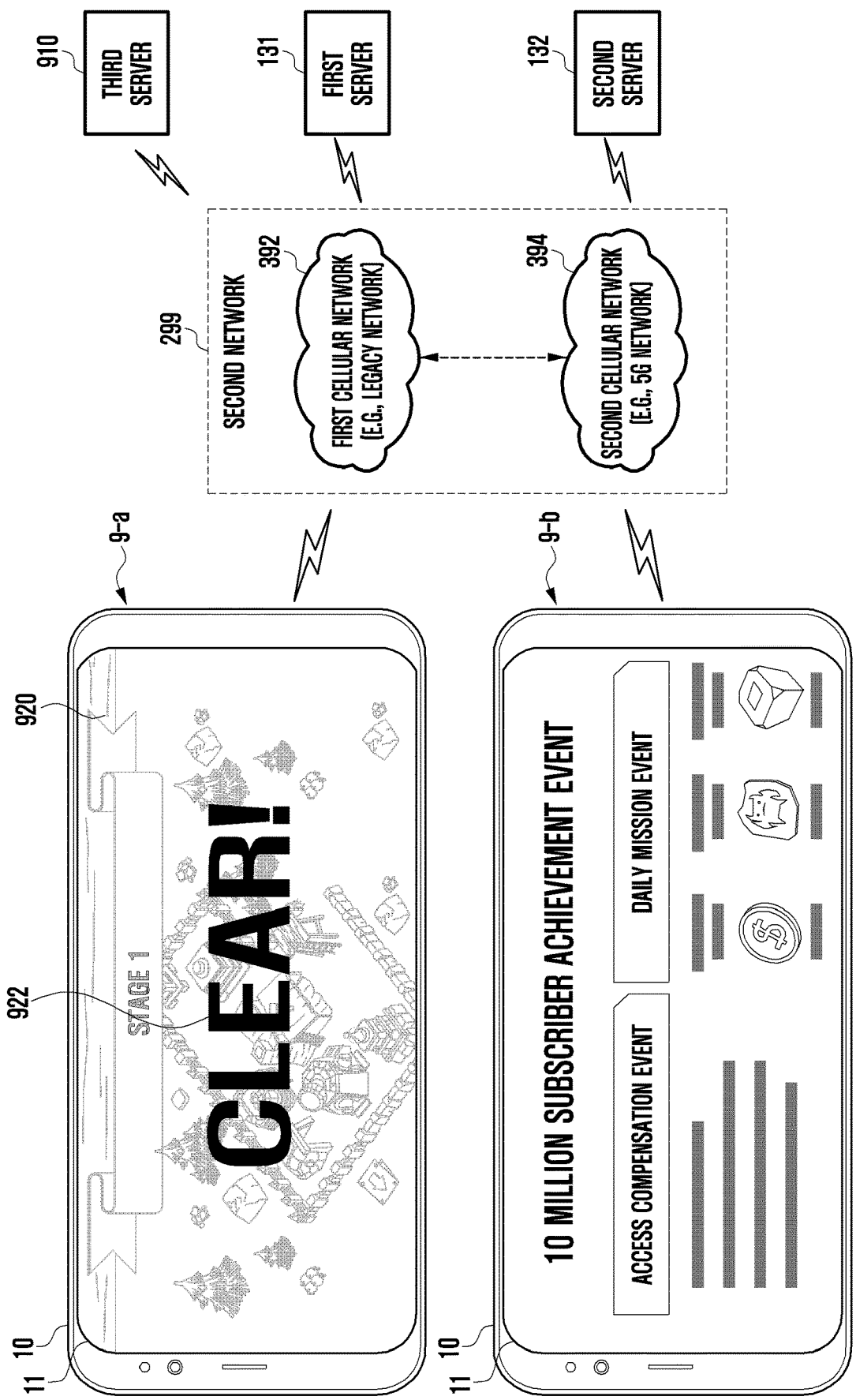
FIG. 9 is a diagram illustrating a situation where the electronic device switches from one communication channel to another based on a type of an external server communicating data with the electronic device according to an embodiment of the disclosure.

FIG. 9 is a diagram illustrating a situation where an electronic device switches from one communication channel to another based on a type of an external server communicating data with the electronic device according to an embodiment of the disclosure.

Referring to FIG. 9, the electronic device 10 may execute an application program 920 and display an execution screen of the game application 920 on a display 11. The electronic device 10 may execute the game application 920 in the course of communicating data with the first server 131 via the second network 299.

According to an embodiment, the electronic device 10 may ascertain an execution status of the game application 920 based on game application data provided by the first server 131 or the game application 920. The electronic device 10 may also receive information on the execution status of the game application 920 from the second server 132.

As denoted by reference number 9-*a* of FIG. 9, the electronic device 10 may control the application program 920 to progress to a stage based on data received via the second cellular network 394 and display an alarm 922 to alert the user to the end of the game on the display 11. After displaying the alarm 922, the electronic device 10 may prepare for receiving data for the next stage of the game application 920.

According to an embodiment, the electronic device 10 may identify data being received from a third server 910. For example, the third server may be a server of an advertisement company associated with a manufacturer manufacturing the game application 920. The electronic device 10 may check an Internet protocol (IP) address of the third server 910 to determine that the received data is not data corresponding to the game application.

According to an embodiment, the electronic device 10 may switch the communication channel to another communication channel for data communication with the third server 910 that is not the communication channel for communication with the first server 131 providing the data corresponding to the game application 920 and the second server 132 providing information on the execution status of the game application 920. For example, the electronic device 10 may switch the communication channel to the first cellular network 392.

As denoted by reference number 9-*b* of FIG. 9, the electronic device 10 may display image data received from the third server 910 on the display 11. The image data received by the electronic device 10 may be an advertisement allowed to be shown in association with the game application. According to various embodiments, if the data communication with the third server 910 providing the advertisement is terminated, the electronic device 10 may switch the communication channel to the second cellular network 394.

As described in the above disclosed embodiment, the electronic device 10 may adaptively switch between multiple cellular networks to communicate data based on the address of the external device providing the data.

Figure 10:
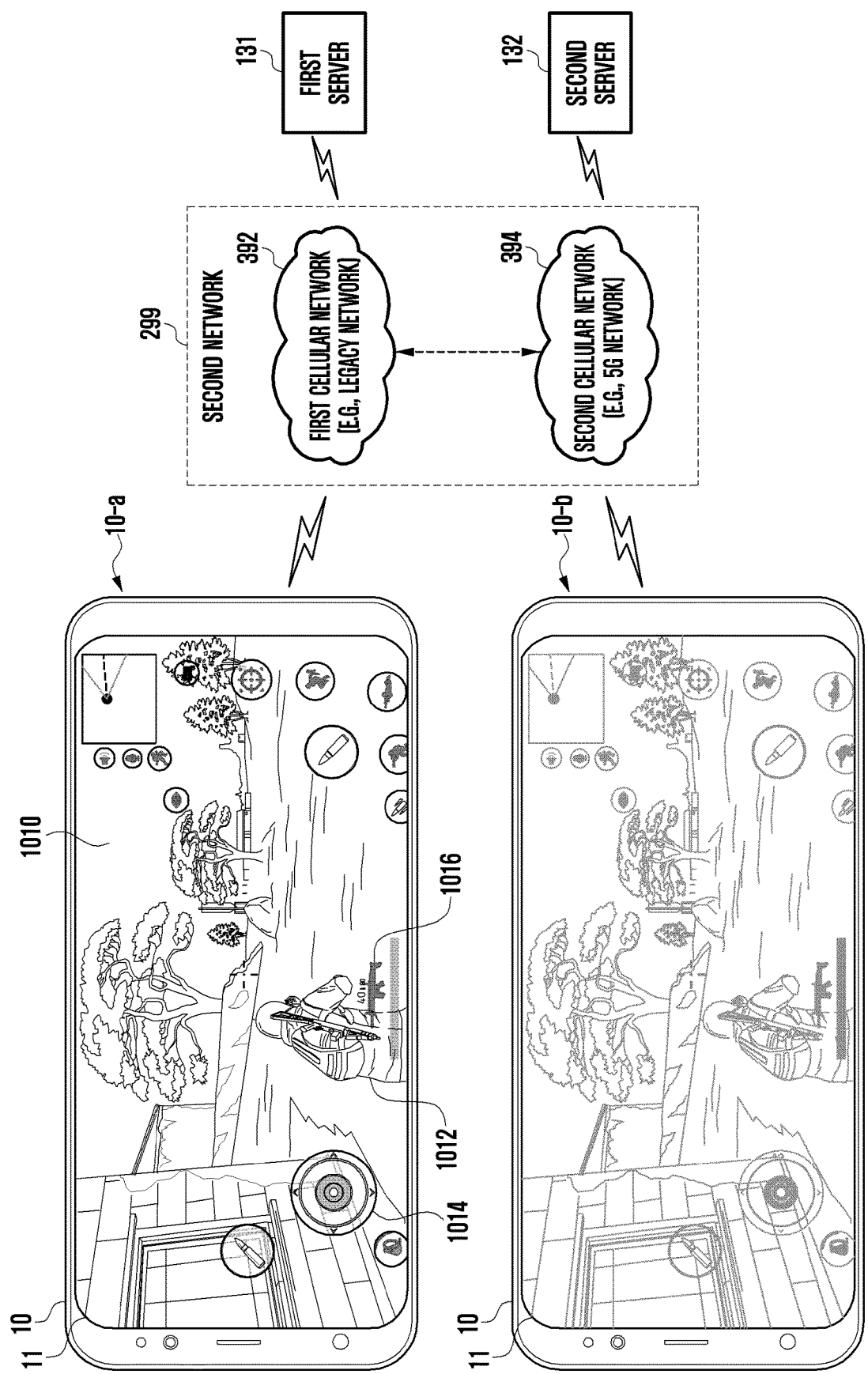
FIG. 10 is a diagram illustrating a situation where an electronic device changes a specification for supporting a game application based on its heat production according to an embodiment of the disclosure.

FIG. 10 is a diagram illustrating a situation where an electronic device changes a specification for supporting a game application based on its heat production according to an embodiment of the disclosure.

Referring to FIG. 10, the electronic device 10 may execute an application program 1010 and display an execution screen of the game application 1010 on a display 11. The electronic device 10 may execute the game application 1010 in the course of communicating data with the first server 131 via the second network 299.

According to an embodiment, the electronic device 10 may sense a temperature of the electronic device 10. For example, the electronic device 10 may sense the temperature of the electronic device by means of a sensor module (e.g., sensor module 276 in FIG. 2) including a temperature sensor.

As denoted by refence number 10-*a* of FIG. 10, the electronic device 10 may display a battle scene of a character 1012 on a display 11. The electronic device 10 may also display together various kinds of icons (e.g., a character facing direction adjustment icon 1014 and an item icon 1016 indicating the item owned by the character). Each of the icons may be provided to activate a predetermined function in response to a user's selection made thereon.

According to an embodiment, the electronic device 10 may identify the battle scene of the character 1012 as a high resource usage status of the electronic device 10 based on the status of the character changing its facing direction continuously in response to a user input and a number of icons (e.g., 3 or more icons) with which the user makes an input. The electronic device 10 may communicate data with the first server 131 via the second cellular network 394 based on the identified execution status.

According to an embodiment, the electronic device 10 may set a resolution of the display 11 to 2560×1440 to execute the game application 1010. The electronic device 10 may also set a frame rate (frame per second (FPS)) to 60 FPS to execute the game application 1010.

According to an embodiment, the electronic device may detect that the sensed temperature is close to a predetermined value (e.g., in the range between 40° C. and 45° C.). If it is determined that the sensed temperature is close to the predetermined value, the electronic device 10 may change a supportable specification for supporting the application that is running. For example, the supportable specification may include at least one of the resolution and frame rate of the display 11.

As denoted by reference number 10-*b* of FIG. 10, the electronic device 10 may change the resolution of the display 11. For example, the electronic device may set the resolution of the display 11 to 1920×1080 or 1280×720.

According to various embodiments, the electronic device 10 may change the frame rate of the display 11. For example, the electronic device 10 may set the frame rate of the display to 15 FPS.

According to various embodiments, the electronic device 10 may decrease a brightness value of the display 11 or an output sound volume.

According to an embodiment, the electronic device 10 may request to the first server 131 to change a transmission data size. For example, the electronic device 10 may request to the first server 131 configured to transmit images at a resolution of 2560×1440 for transmission of the images at a resolution of 1920×1080 or 1280×720.

The electronic device 10 may also request to the first server 131 configured to transmit images at a frame rate of 60 FPS for transmission of the images at a frame rate of 15 FPS.

As described in the above disclosed embodiment, the electronic device 10 may adjust the specification for supporting the application that is running based on a sensed temperature to reduce heat production.

According to various embodiments, the electronic device 10 may perform image processing on the data received from the first server 131. For example, if an image having a resolution of 1920×1080 or 1280×720 is received, the electronic device 10 may perform up-scaling on the received image to generate an image having a resolution of 2560×1440.

If images are received at a frame rate of 15 FPS, the electronic device 10 may improve smoothness of the images using an image polarization algorithm.

As described in the above disclosed embodiment, the electronic device 10 is capable of reducing heat production and maintaining a smooth application progress by selectively performing post-processing on the received data.

Figure 11:
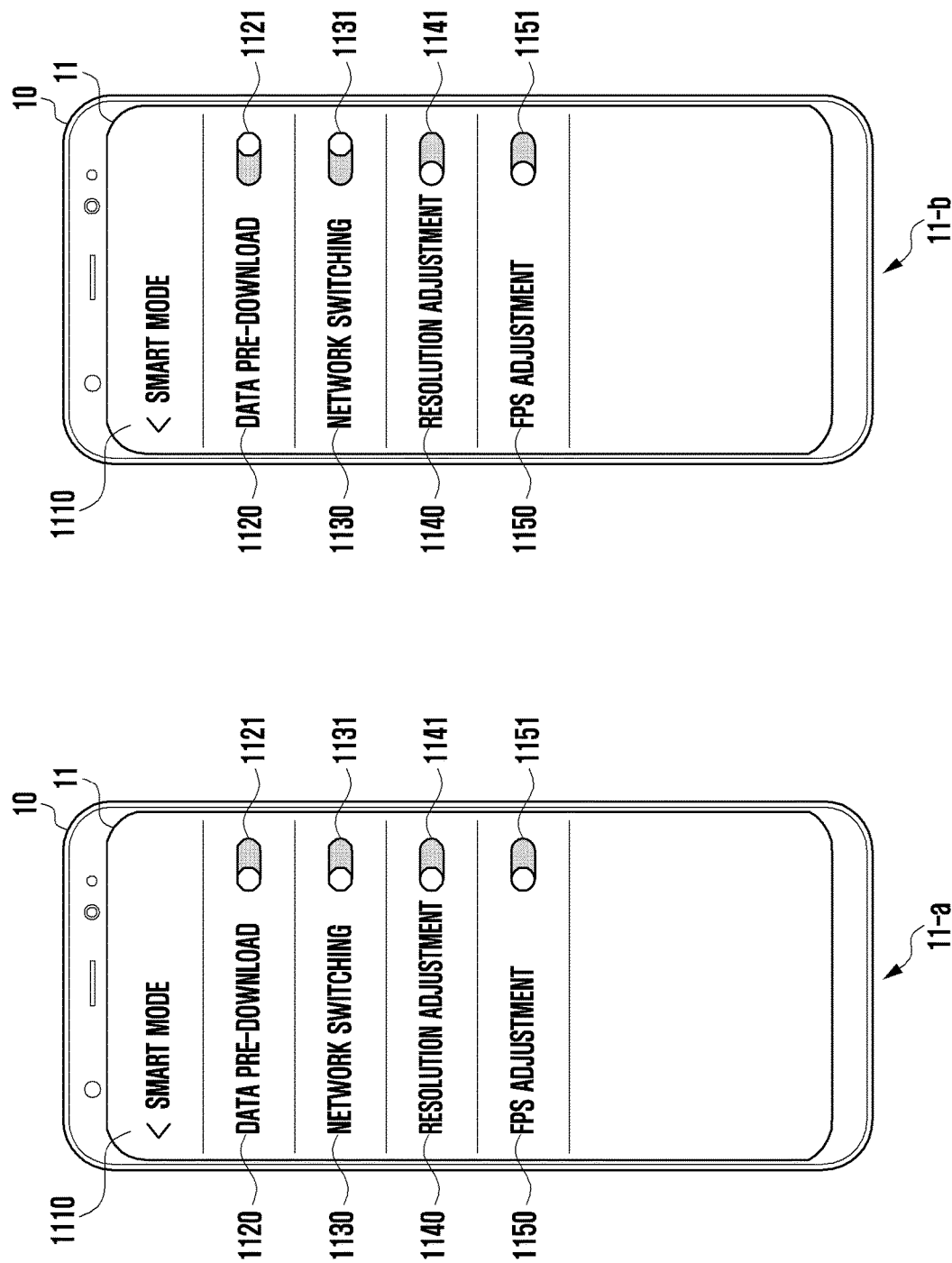
FIG. 11 is a diagram illustrating a user interface for setting operations for reducing heat production of an electronic device according to an embodiment of the disclosure.

FIG. 11 is a diagram illustrating a user interface for setting operations for reducing heat production of an electronic device according to an embodiment of the disclosure.

Referring to FIG. 11, as denoted by reference number 11-*a*, the electronic device 10 may provide a user interface 1110 for setting a mode for reducing heat production (e.g., smart mode) of the electronic device 10.

For example, the smart mode user interface 1110 may provide execution objects 1121, 1131, 1141, and 1151 that allow a user to activate or deactivate a "data pre-download" function 1120, a "network switching" function 1130, a "resolution adjustment" function 1140, of an "FPS adjustment" function 1150. For example, the "data pre-download" function 1120 may correspond to the embodiments of FIGS. 6 and 8, and the "network switching" function 1130 may correspond to the embodiments of FIGS. 7 and 9. Meanwhile, the "resolution adjustment" function 1140 and the "FPS adjustment" function 1150 may correspond to the embodiment of FIG. 10. However, the functions are not limited to the disclosed embodiments.

As denoted by reference number 11-*b* of FIG. 11, the electronic device 10 may determine whether to activate or deactivate each of the functions based on events triggered with the execution objects 1121, 1131, 1141, and 1151 in response to external inputs. For example, the electronic device 10 may activate the "data pre-download" function 1120 and the "network switching" function 1130 in response to the events triggered, with the corresponding objects 1121 and 1131, for activating the "data pre-download" function 1120 and the "network switching" function 1130 and deactivate the "resolution adjustment" function 1140 and the "FPS adjustment" function 1150 in response to the events triggered, with the corresponding objects 1141 and 1151, for deactivating the "resolution adjustment" function 1140 and the "FPS adjustment" function 1150.

As described above, the electronic device and control method thereof disclosed in various embodiments is advantageous in terms of allowing the electronic device to switch between multiple communication channels in different frequency bands according to the application execution status and temperature of the electronic device.

The electronic device and control method thereof disclosed in various embodiments is advantageous in terms of allowing a supportable specification of the electronic device to be changed for executing an application according to the application execution status and temperature of the electronic device.

The electronic device and control method thereof disclosed in various embodiments is advantageous in terms of allowing the electronic device to request to an external device for a change of a transmission data size for the application in execution according to the application execution status and temperature of the electronic device.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   wireless communication circuitry including a first communication processor and a second communication processor;
   a sensor configured to sense a temperature;
   at least one processor; and
   at least one memory configured to store instructions, executable by the at least one processor, for:
   receiving data corresponding to an application from a first server,
   identifying an execution status of the application based on the received data and the temperature of at least a part of the electronic device,
   deactivating the second communication processor based on the identified execution status of the application and the identified temperature, and
   activating the second communication processor based on network traffic being processed by the first communication processor being greater than a predetermined threshold,
   wherein the application includes a game application, and
   wherein the network traffic includes a high volume of data representing game characters appear in the game application.

2. The electronic device of claim 1, wherein the instructions comprise further instructions, executable by the at least one processor, for receiving information on the execution status of the application from a second server.

3. The electronic device of claim 1, wherein the instructions comprise further instructions, executable by the at least one processor, for:
   deactivating the second communication processor based on the execution status indicating a low resource usage state of the electronic device or the identified temperature being close to a predetermined value, and
   activating the first communication processor.

4. The electronic device of claim 1, wherein the instructions comprise further instructions, executable by the at least one processor, for:
   deactivating a communication channel established by an antenna corresponding to a first frequency band based on the execution status indicating a high resource usage state of the electronic device or the identified temperature being close to a predetermined value, and
   activating a communication channel established by an antenna corresponding to a second frequency band.

5. The electronic device of claim 1, wherein the instructions comprise further instructions, executable by the at least one processor, for changing a supportable specification of the electronic device for executing the application based on the identified execution status of the application and the identified temperature.

6. The electronic device of claim 5, wherein the supportable specification of the electronic device comprises at least one of a resolution of a display and a frame rate of the display.

7. The electronic device of claim 1, wherein the instructions comprise further instructions, executable by the at least one processor, for requesting to the first server for change of a transmission data size for the application based on the identified execution status of the application and the identified temperature.

8. The electronic device of claim 7, wherein the instructions comprise further instructions, executable by the at least one processor, for performing image processing on data corresponding to the application that is received after a transmission data size is changed.

9. The electronic device of claim 5, further comprising:
   a display,
   wherein the instructions comprise further instructions, executable by the at least one processor, for displaying a user interface including execution objects for activating or deactivating a function for switching between the first communication processor and the second communication processor and a function for changing the supportable specification of the electronic device on the display.

10. A control method of an electronic device, the method comprising:
receiving, in response to executing of an application, data corresponding to the application from a first server;
identifying an execution status of the application based on the received data and a temperature of at least a part of the electronic device;
deactivating a second communication processor based on the identified execution status of the application and the identified temperature; and
activating the second communication processor based on network traffic being processed by a first communication processor being greater than a predetermined threshold,
wherein the application includes a game application, and
wherein the network traffic includes a high volume of data representing game characters appear in the game application.

11. The method of claim 10, wherein the identifying of the execution status of the application comprises receiving information on the execution status of the application from a second server.

12. The method of claim 10, further comprising:
deactivating the second communication processor based on the execution status indicating a low resource usage state of the electronic device or the identified temperature being close to a predetermined value; and
activating the first communication processor.

13. The method of claim 10, further comprising:
deactivating a communication channel established by an antenna corresponding to a first frequency band based on the execution status indicating a high resource usage state of the electronic device or the identified temperature being close to a predetermined value; and
activating a communication channel established by an antenna corresponding to a second frequency band.

14. The method of claim 10, further comprising changing a supportable specification of the electronic device for executing the application based on the identified execution status of the application and the identified temperature.

15. The method of claim 10, further comprising requesting a change of a transmission data size for the application received from the first server based on the identified execution status of the application and the identified temperature.

16. The method of claim 15, further comprising performing image processing on data corresponding to the application that is received after the transmission data size is changed.

17. The method of claim 14, further comprising:
displaying a user interface including execution objects for activating or deactivating a function for switching between the first communication processor and second communication processor; and
displaying a function for changing the supportable specification of the electronic device.

18. A non-transitory computer-readable storage medium storing a program for a computer to perform a control method, the program comprising instructions that when executed by at least one processor of an electronic device, perform the control method by:
receiving, in response to executing of an application, data corresponding to the application from a first server,
identifying an execution status of the application based on the received data and a temperature of at least a part of the electronic device;
deactivating a second communication processor based on the identified execution status of the application and the identified temperature; and
activating the second communication processor based on network traffic being processed by a first communication processor being greater than a predetermined threshold,
wherein the application includes a game application, and
wherein the network traffic includes a high volume of data representing game characters appear in the game application.

* * * * *